United States Patent [19]

Schakel et al.

[11] Patent Number: 5,567,504

[45] Date of Patent: Oct. 22, 1996

[54] GLASS FIBER DUCT BOARD WITH COATED GROOVES AND THE METHOD OF MAKING THE SAME

[75] Inventors: Eric G. Schakel, Sedalia; Robert R. Coleman, Westminster; Kent R. Matthews, Littleton, all of Colo.; Lowell K. Morton, Greenville, S.C.

[73] Assignee: Schuller International, Inc., Denver, Colo.

[21] Appl. No.: 250,982

[22] Filed: May 31, 1994

[51] Int. Cl.⁶ .................. B32B 3/28; B32B 3/30
[52] U.S. Cl. .................. 428/167; 83/875; 427/289; 427/373; 427/389.8
[58] Field of Search .............. 83/875–8, 13–16; 427/289, 373, 389.8; 428/167

[56] References Cited

U.S. PATENT DOCUMENTS 3,875,835  4/1975  Roberts ........................... 83/5
4,681,722  7/1987  Carter et al. .................... 156/324 X
4,781,510  11/1988  Smith et al. ..................... 414/119
4,990,370  2/1991  Terry et al. ..................... 427/209

*Primary Examiner*—Michael Lusignan
*Attorney, Agent, or Firm*—Cornelius P. Quinn

[57] ABSTRACT

A glass fiber duct board has longitudinally extending, spaced-apart grooves in a major surface that facilitate the folding of the duct board into an air duct. The major surface, including the grooves, is coated with a polymeric latex coating to encapsulate glass fibers and dust within the surface of the duct board. The polymeric latex coating is applied to the surfaces of the grooves as a foam by application nozzles located downstream of groove cutting tools. The polymeric latex coating applied by the nozzles is distributed over the surfaces of the grooves and set to a predetermined thickness by wiper blades, located downstream of the nozzles, which have edge configurations complementary to the transverse configurations of the grooves being coated.

11 Claims, 2 Drawing Sheets

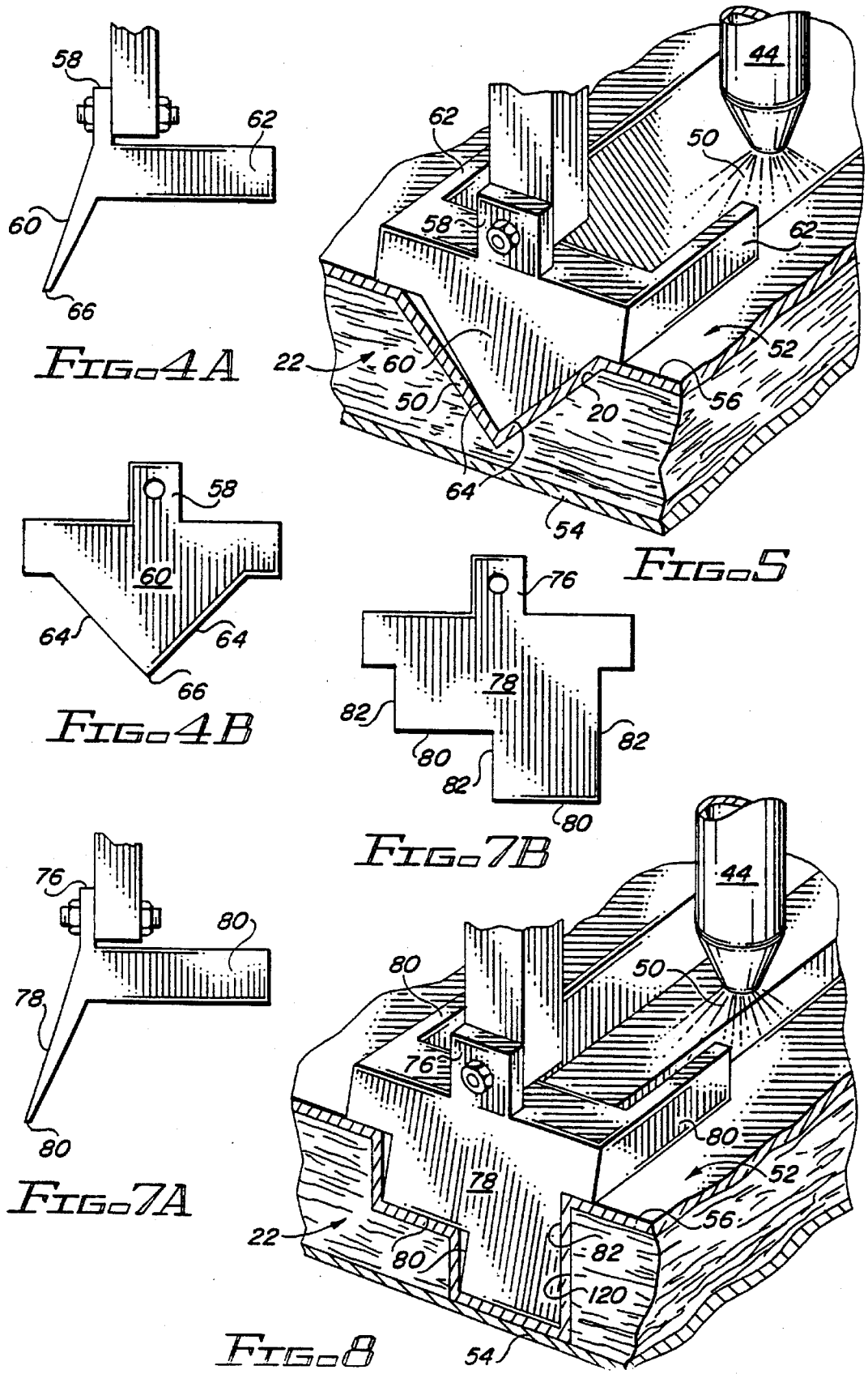

GLASS FIBER DUCT BOARD WITH COATED GROOVES AND THE METHOD OF MAKING THE SAME

BACKGROUND OF THE INVENTION

This invention generally relates to a coated glass fiber duct board and a method of and apparatus for surface coating the grooves of a glass fiber duct board. More specifically, the invention relates to such a duct board and to an on-line method of and apparatus for applying a surface coating to the grooves of the glass fiber duct board, immediately following the cutting of the grooves in the duct board, to encapsulate the glass fibers exposed and dust created by the groove cutting operation within the surfaces of the grooves.

Dense, rigid, glass fiber duct boards are commonly used to form ductwork in heating, ventilating and air conditioning systems. These duct boards are rigid, strong and self supporting and, after the duct boards are grooved, the duct boards are folded to form the ductwork which has a rectangular transverse cross section.

A somewhat less dense flexible glass fiber blanket is normally used as an internal liner for sheet metal ductwork in heating, ventilating and air conditioning systems. These glass fiber blankets (duct liners) are normally adhered to the sheet metal before the sheet metal is folded to form the ductwork and, due to the flexibility and compressibility of the glass fiber blanket, the duct liner can normally be folded with the sheet metal as the ductwork is formed without the need to cut grooves in the glass fiber blanket to facilitate the folding operation. However, it is contemplated that a dense glass fiber duct board could also be used as a duct liner for sheet metal air ducts in certain applications. Should a glass fiber duct board be used as a liner for sheet metal ductwork, the duct board would be grooved to facilitate the folding operation just as the duct board is grooved when it is used alone to form ductwork.

In addition to serving as an air duct or a duct liner, the glass fiber duct boards function as an insulation: to conserve energy and to maintain the temperature of the air being conveyed within the ductwork within a certain temperature range; to prevent the condensation of moisture on the exterior surfaces of sheet metal ductwork; and to efficiently absorb and control airborne noises.

The surface of the glass fiber duct board forming the interior surface of the air duct is exposed to high velocity air flows. Accordingly, the surface of the duct board that forms the interior surface of the air duct is often coated with a polymeric latex material during the manufacturing operation. The polymeric latex coating forms a tough surface skin on the surface of the duct board that prevents the erosion of glass fibers from the surface by the high velocity air flows passing through the air duct. U.S. Pat. No. 4,990,370, issued on Feb. 5, 1991, to Manville Corporation and entitled "On-Line Surface and Edge Coating of Fiber Glass Duct Liner" discloses a method of and an apparatus for coating glass fiber duct boards and the disclosure of this patent is hereby incorporated herein by reference in its entirety.

However, when the glass fiber duct boards are grooved and formed into ductwork or duct liners at the fabricator's shop or at the job site, the cutting of the grooves in the coated surfaces of the glass fiber duct boards forms uncoated groove surfaces exposing both glass fibers and dust created during the grooving operation. Heretofore, the grooves cut into the glass fiber duct boards at the fabricator's shop or at the job site have remained uncoated leaving the glass fibers and dust in the groove surfaces exposed during the fabrication of the air duct from the duct boards. U.S. Pat. No. 3,875,835, issued on Apr. 8, 1975, to Johns-Manville Corporation, and entitled "Duct Board Cutting Apparatus and Method"; and U.S. Pat. No. 4,781,510, issued on Nov. 1, 1988, to Manville Service Corporation, and entitled "Insulation Board Feeder"; disclose methods of and apparatus for cutting grooves into the surfaces of glass fiber duct boards and the disclosures of these patents are hereby incorporated herein by reference in their entirety.

SUMMARY OF THE INVENTION

Accordingly, it is an object of the present invention to form a glass fiber duct board with grooves, to facilitate the folding and fabrication of the duct board into ductwork, wherein the grooves are coated with a polymeric latex material to encapsulate the glass fibers and any dust created during the grooving operation within the surfaces of the grooves. Glass fiber duct boards, having a major surface coated with a polymeric coating, are grooved by a duct board grooving apparatus such as that disclosed in U.S. Pat. No. 3,875,835, referred to above. However, in addition to the groove cutting station of the apparatus of the '835 patent, the groove cutting apparatus of the present invention includes a groove coating station that is located immediately downstream of the groove cutting station. In the groove coating station, a polymeric foam coating material is deposited in each groove through an application nozzle. The polymeric foam coating material deposited in each groove is then distributed over the surfaces of the groove to a predetermined thickness by a wiper blade located immediately downstream from the application nozzle. The wiper blade has a configuration complementary to the transverse cross sectional configuration of the groove. The thickness of the coating applied to the groove surfaces is determined by the spacing between the surfaces of the grooves and the opposing edges of the wiper blade. After the coating material is applied to the groove surfaces, the coating material is cured under ambient conditions to encapsulate glass fibers and any dust created during the grooving operation within the surfaces of the groove. Preferably, the polymeric latex coating material contains both fire retardant and anti-microbial agents.

BRIEF DESCRIPTION OF THE DRAWINGS

FIG. 4 is a side view and end view of a wiper blade assembly that is used in conjunction with the V-shaped grooves.

FIG. 5 is a fragmentary perspective view of the coating station showing a V-shaped groove being coated.

FIG. 7 is a side view and an end view of a wiper blade assembly that is used in conjunction with shiplap grooves.

FIG. 8 is a fragmentary perspective view of the coating station showing a shiplap groove being coated.

DESCRIPTION OF THE PREFERRED EMBODIMENTS

Figure 1:
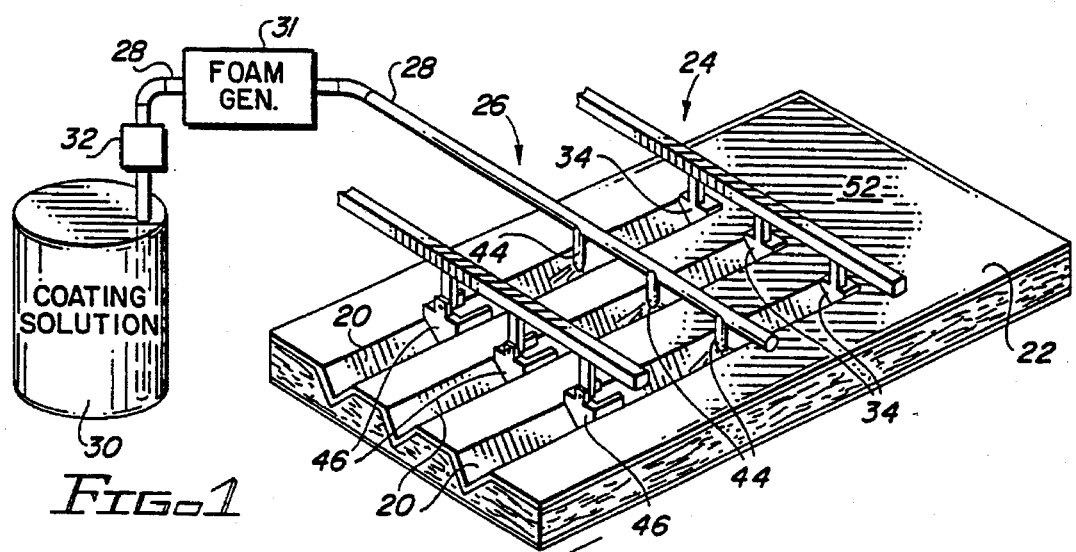
FIG. 1 is a schematic perspective view of the duct board grooving apparatus of the present invention showing the relationship between the groove cutting station and the groove coating station.

FIG. 1 is a schematic view illustrating the cutting and coating of grooves 20 in a glass fiber duct board 22. As shown, the groove cutting station 24 of the grooving apparatus is located immediately upstream of the groove coating station 26 so that the raw surfaces of the grooves 20 created during the cutting operation are coated just after the cutting operation is completed. The polymeric coating material is supplied to the groove coating station 26 under pressure through a supply line 28 that runs from a pressurized coating material feed tank 30 to a conventional, commercially available foam generator 31 and from the foam generator to the groove coating station. The supply line 28 is provided with a valve 32 to meter or control the amount of polymeric foam coating material delivered to the coating station 26.

Figure 2:
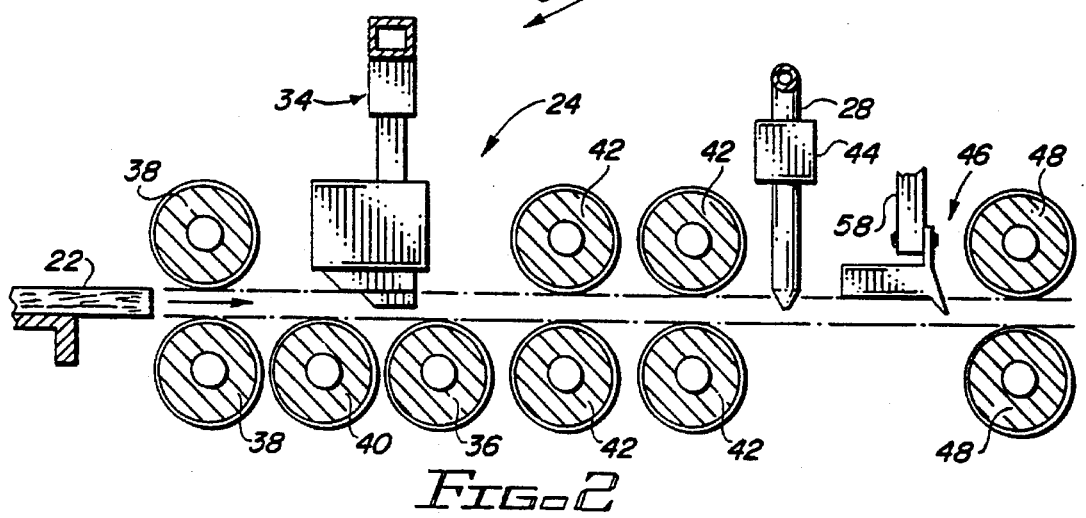
FIG. 2 is a cross sectional view through the groove cutting station and the groove coating station of the grooving apparatus of the present invention.

FIG. 2 is a cross-sectional view through the groove cutting station 24 and the groove coating station 26 to show the cutting and the coating operations in greater detail. The cross-sectional view of FIG. 2 is similar to FIG. 4 of the '835 patent and shows how the apparatus of the '835 patent can be modified to incorporate the groove coating station used in the method and apparatus of the present invention. As shown, the groove cutting station 24 comprises a plurality of cutting tools 34, a backing roll 36, feed rolls 38, a guide roll 40 and pull rolls 42. The groove coating station 26 comprises a plurality of coating material application nozzles 44, a plurality of coating material wiper blade assemblies 46 and pull rolls 48. The coating material application nozzles 44 are connected to the foam generator 31 and the coating material feed tank 30 through the supply line 28. The feed rolls 38, the pull rolls 42 and the pull rolls 48 are all driven by a conventional DC motor and drive assembly (not shown).

While it is contemplated that the duct boards 22 could be continuous and cut to length after the grooving operation, the duct boards 22 are normally precut to a predetermined length prior to the grooving operation. The precut duct boards are fed into the groove cutting station 24 by the feed rolls 38 and guided between the cutting tools 34 and the backing roll 36 where the grooves 20 are cut into the upper major surfaces of the duct boards. The pull rolls 42 draw the duct boards 22 from the groove cutting station 24 and feed the grooved duct boards into the groove coating station 26 where the foamed polymeric coating material 50 is deposited in the grooves 20 by the application nozzles 44. The foamed polymeric coating material 50, which has a consistency of foamed shaving cream, is then distributed across the surfaces of the grooves 20 by the wiper blade assemblies 46 as the duct boards are pulled from the groove coating station 26 by the pull rolls 48. From the pull rolls 48, the duct boards 22 pass to a receiving station from which the duct boards can be placed in inventory or directly fabricated into ductwork by folding the duct boards along the grooves 20.

Figure 3:
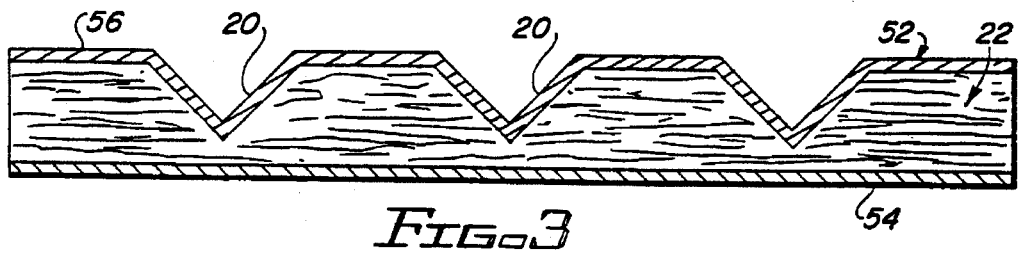
FIG. 3 is an end view of a glass fiber duct board of the present invention with coated V-shaped grooves.

FIG. 3 is an end view of a glass fiber duct board 22 with V-shaped grooves 20 cut into its upper major surface 52. As shown, the V-shaped grooves 20 and the upper major surface 52 of the duct board 22 are both coated with an encapsulating material, such as a polymeric acrylic latex coating material. One polymeric acrylic latex coating, that can be used in the present invention, is an EVODE-TANNER XA 9900 Series acrylic latex coating with both fire retardant and anti-microbial agents. The opposite major surface of the duct board 22 has a facing sheet such as, a foil-scrim-kraft facing sheet or a sheet metal sheet 54 adhered thereto. While the grooves 20 may be cut almost entirely through the duct board 22, the depths of the grooves 20 are controlled such that the facing sheet or the sheet metal sheet 54 on the underside of the duct board is not cut and remains in one piece.

FIG. 4 shows a wiper blade assembly 46 that can be used to distribute the foamed coating material 50 evenly over the surfaces of a V-shaped groove. The wiper blade assembly 46 comprises a mounting bracket 58 for mounting the wiper blade assembly on a grooving apparatus; a depending V-shaped wiper blade 60 for distributing the polymeric foam coating material 50 over the groove surfaces; and a pair of extensions 62 for confining the coating material within the groove. The wiper blade assembly 46 shown in FIG. 4 is made of stainless steel or some other suitable material.

As shown in FIG. 5, the foamed polymeric coating material 50 is deposited in each groove by the application nozzle 44 immediately upstream of the wiper blade assembly 46. A pool of the foamed polymeric coating material 50 forms in each groove 20 upstream of the wiper blade assembly 46 and as the duct board 22 passes beneath the wiper blade assembly, the V-shaped wiper blade 60 of the wiper blade assembly distributes the foamed coating material 50 evenly over the surfaces of the groove 20. The wiper blade 60 of the wiper blade assembly 46 is complementary in configuration to the transverse cross section of the V-shaped groove 20. As shown in FIG. 5, the edges 64 of the wiper blade 60 of the wiper blade assembly are spaced a preselected distance from the surfaces of the groove 20. Thus, a regulated amount of the foamed polymeric coating material 50 is applied to the surfaces of the V-shaped groove as it passes beneath the wiper blade assembly 46.

As best shown in FIG. 4, the V-shaped wiper blade 60 is inclined in an upstream direction from the apex 66 of the blade to the upper portion of the wiper blade assembly 46. This inclination of the wiper blade 60 in the upstream direction causes the foamed coating material 50, that does not pass beneath the wiper blade as a coating layer, to be recirculated back into the pool of foamed coating material deposited in the groove 20 by the application nozzle 44. The extensions 62 of each wiper blade assembly 46 cooperate with the upper major surface 52 of the glass fiber duct board adjacent the upper longitudinal edges of each groove 20 to confine the foamed coating material within the groove so that the coating material is not applied to the upper major surface of the duct board which often is already coated with an encapsulating material 56. After the coating material 50 is applied to the surfaces of the grooves 20, the coating material cures and hardens under ambient conditions to form a duct board ready to be folded into an air duct or a liner of an air duct. The glass fibers in the surfaces of the grooves and any dust created by the grooving operation are encapsulated within the surfaces of the grooves by the coating material 50. The glass fibers in the major surface 52 of the duct board are encapsulated in the major surface of the duct board by coating 56.

Figure 6:
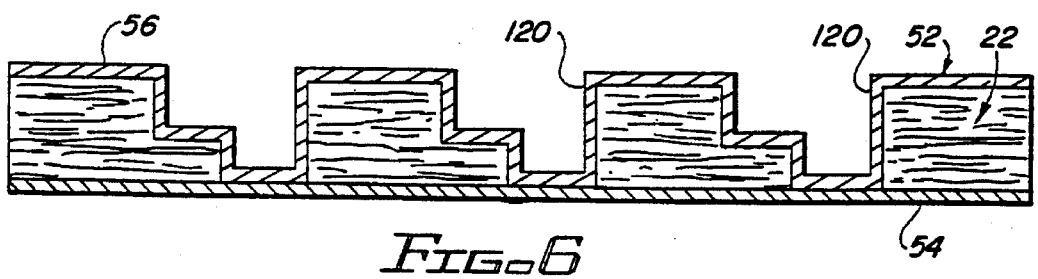
FIG. 6 is an end view of a glass fiber duct board of the present invention with coated shiplap grooves.

FIG. 6 is an end view of a glass fiber duct board 22 with shiplap grooves 120 cut into its upper major surface 52. As shown, the shiplap grooves 120 and the upper major surface 52 of the duct board are both coated with an encapsulating material, such as the polymeric acrylic latex coating material described in connection with the embodiment of FIG. 3. The opposite major surface of the duct board 22 has a facing sheet or a sheet metal sheet 54 adhered thereto. While the grooves 120 may be cut almost entirely through the duct board 22, the depths of the grooves are controlled such that the facing sheet or the sheet metal sheet 54 on the underside of the duct board is not cut and remains in one piece.

FIG. 7 shows a wiper blade assembly 46 that can be used to distribute the coating material 50 evenly over the surfaces of a shiplap groove. The wiper blade assembly 46 comprises a mounting bracket 76 for mounting the wiper blade assembly on a grooving apparatus; a depending shiplap shaped wiper blade 78; and a pair of extensions 80 for confining the coating material 50 within the groove 120. As with the wiper blade assembly of FIG. 4, the wiper blade assembly of FIG. 7 is made of stainless steel or other suitable materials.

As shown in FIG. 8, the foamed polymeric coating material 50 is deposited in each groove 120 by the application nozzle 44 immediately upstream of the wiper blade assembly 46. A pool of the foamed polymeric coating material 50 forms in each groove 120 upstream of the wiper blade assembly 46 and as the duct board 22 passes beneath the wiper blade assembly, the shiplap shaped wiper blade 78 of the wipe blade assembly distributes the coating material evenly over the surfaces of the groove. The wiper blade 78 of the wiper blade assembly is complementary in configuration to the transverse cross section of the shiplap groove 120 being coated. As shown in FIG. 8, the lower edges 80 and the lateral edges 82 of the wiper blade portion 78 of the wiper blade assembly are spaced a predetermined distance from the surfaces of the groove 120. Thus, a regulated amount of the coating material 50 is applied to the surfaces of the shiplap groove as it passes beneath the wiper blade assembly 46.

As best shown in FIG. 7, the wiper blade 78 of the wiper blade assembly is inclined in an upstream direction from the bottom edges 80 of the wiper blade to the upper portion of the wiper blade assembly. This inclination of the wiper blade 78 in the upstream direction causes the coating material 50, that does not pass beneath the wiper blade as a coating layer, to be recirculated back into the pool of coating material deposited in the groove by the application nozzle 44. The extensions 80 of each wiper blade assembly cooperate with the upper major surface 52 of the duct board adjacent the upper longitudinal edges of each groove 120 to confine the coating material 50 within the groove so that the coating material is not applied to the upper surface of the duct board which is often already coated with an encapsulating material 56. After the coating material 50 is applied to the surfaces of the shiplap grooves 120, the coating material cures and hardens under ambient conditions to form a duct board ready to be folded into an air duct or a liner of an air duct. The glass fibers in the surfaces of the shiplap grooves 120 and any dust created by the grooving operation are encapsulated within the surfaces of the grooves by the coating material 50. The glass fibers in the major surface 52 of the duct board 22 are encapsulated in the major surface of the duct board by the coating 56.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A method of making a glass fiber duct board with coated grooves, comprising:

passing a glass fiber duct board having a major surface that is precoated with a polymeric coating to encapsulate glass fibers within the major surface of the duct board through a groove cutting station and a groove coating station;

cutting a plurality of spaced-apart grooves of a selected configuration in the major surface of the duct board with cutting tools as the duct board passes through the groove cutting station so that the duct board can be folded along the grooves;

applying a foamed polymeric latex coating material to all surfaces of each of the grooves with nozzles located downstream of the cutting tools as the duct board passes through the groove coating station; and engaging the foamed polymeric latex coating material applied by the nozzles with wiper blades located downstream of the nozzles; the wiper blades each having edges which conform in configuration to a transverse configuration of the groove with which the wiper blade is used and which are spaced a selected distance from the surfaces of the groove to distribute the foamed polymeric latex coating material across the surfaces of the groove and to set the thickness of the layer of foamed polymeric coating material formed on the surfaces of the groove to thereby encapsulate glass fibers and dust within the surfaces of the groove; and the wiper blades each having extensions which extend upstream from the wiper blade adjacent upper longitudinal edges of the groove with which the wiper blade is used and cooperate with the precoated upper major surface of the glass fiber insulation board to confine the foamed polymeric latex coating material being applied to the groove within the groove.

2. The method of claim 1, wherein: the grooves and the wiper blades each have a V-shaped configuration.

3. The method of claim 1, wherein: the grooves and the wiper blades each have a shiplap shaped configuration.

4. The method of claim 1, wherein: the polymeric latex coating has fire retardant and anti-microbial agents therein.

5. The method of claim 1, wherein: the glass fiber duct board is continuous in length.

6. The method of claim 1, wherein: the glass fiber duct board has a finite length.

7. A glass fiber duct board comprising: a sheet of glass fiber duct board having a planar interior major surface, lateral edges and end edges; continuous, spaced-apart grooves cut into the interior major surface of the duct board and extending between the end edges of the duct board to facilitate the folding of the duct board along the grooves to form a duct; and the interior major surface, including surfaces of the grooves, being coated with a polymeric coating to encapsulate glass fibers and dust within the interior major surface of the duct board.

8. The glass fiber duct board of claim 7, wherein: the grooves each have a V-shaped transverse configuration.

9. The glass fiber duct board of claim 7, wherein: the grooves each have a shiplap shaped transverse configuration.

10. The glass fiber duct board of claim 7, wherein: a sheet material is adhered to a second major surface of the duct board.

11. The glass fiber duct board of claim 7, wherein: the polymeric coating has fire retardant and anti-microbial agents.

* * * * *